(12) United States Patent
Ragsdale et al.

(10) Patent No.: US 7,455,301 B2
(45) Date of Patent: Nov. 25, 2008

(54) SEAMLESS CORRUGATED INSERT GASKET AND METHOD OF FORMING THE SAME

(75) Inventors: Tyler Hamilton Ragsdale, Dinwiddie, VA (US); Robert Adam Riggs, Chesterfield, VA (US); Alfred F. Waterland, III, Chesterfield, VA (US)

(73) Assignee: Virginia Sealing Products, Inc., Hopewell, VA (US)

( * ) Notice: Subject to any disclaimer, the term of this patent is extended or adjusted under 35 U.S.C. 154(b) by 71 days.

(21) Appl. No.: 11/366,288

(22) Filed: Mar. 2, 2006

(65) Prior Publication Data

US 2007/0205566 A1 Sep. 6, 2007

(51) Int. Cl.
*F16J 15/08* (2006.01)
*F16J 15/02* (2006.01)
*F16J 15/10* (2006.01)

(52) U.S. Cl. .............. 277/627; 277/639; 277/644; 277/650; 277/651; 277/652

(58) Field of Classification Search ......... 277/534–535, 277/538–539, 610, 627, 633, 639, 644, 650, 277/651–653
See application file for complete search history.

(56) References Cited

U.S. PATENT DOCUMENTS

| | | | |
|---|---|---|---|
| 854,135 A * | 5/1907 | Whittemore | 428/175 |
| 922,130 A | 5/1909 | Goetze | |
| 2,580,546 A | 1/1952 | Hobson, Jr. | |
| 2,868,575 A | 1/1959 | Hawxhurst | |
| 3,031,357 A | 4/1962 | Balkin et al. | |
| 3,230,290 A | 1/1966 | Nelson et al. | |
| 3,595,589 A | 7/1971 | Henderson | |
| 3,953,566 A | 4/1976 | Gore | |
| 4,187,390 A * | 2/1980 | Gore | 174/102 R |
| 4,234,638 A * | 11/1980 | Yamazoe et al. | 428/133 |
| 4,455,334 A * | 6/1984 | Ogino et al. | 428/34.1 |
| 4,540,183 A | 9/1985 | Schneider et al. | |
| 4,795,174 A | 1/1989 | Whitlow | |
| 4,900,629 A | 2/1990 | Pitolaj | |
| 4,915,355 A | 4/1990 | Fort | |
| 4,961,891 A | 10/1990 | Pitolaj | |
| 4,990,296 A | 2/1991 | Pitolaj | |
| 5,407,214 A | 4/1995 | Lew et al. | |
| 5,421,594 A | 6/1995 | Becerra | |
| 5,466,531 A | 11/1995 | Tippett et al. | |
| 5,551,706 A | 9/1996 | Barna et al. | |
| 5,556,113 A | 9/1996 | Amorese et al. | |
| 5,558,347 A * | 9/1996 | Nicholson | 277/652 |
| 5,749,586 A | 5/1998 | Abe et al. | |
| 5,785,322 A | 7/1998 | Suggs et al. | |
| 5,879,789 A | 3/1999 | Dolan et al. | |
| 6,092,811 A | 7/2000 | Bojarczuk et al. | |

(Continued)

FOREIGN PATENT DOCUMENTS

DE 3641810 6/1988

(Continued)

*Primary Examiner*—Vishal Patel
(74) *Attorney, Agent, or Firm*—Thomas & Raring, P.C.

(57) ABSTRACT

The invention relates to a seamless hybrid gasket and the method of making the same. The gasket includes a unitary polymer construction and an insert for enhanced pressure resistance, reduced stress to seal, improved thermal cycling performance and structural support.

8 Claims, 4 Drawing Sheets

U.S. PATENT DOCUMENTS

| | | |
|---|---|---|
| 6,485,809 B1 | 11/2002 | Minor et al. |
| 6,540,852 B1 * | 4/2003 | Suggs et al. ............... 156/62.2 |
| 6,565,099 B1 | 5/2003 | Ottinger et al. |
| 6,824,140 B2 | 11/2004 | Frew et al. |
| 6,845,983 B1 * | 1/2005 | Suggs et al. ............... 277/314 |
| 2002/0050689 A1 | 5/2002 | Crawford |
| 2004/0119248 A1 | 6/2004 | Micciche et al. |
| 2004/0173978 A1 * | 9/2004 | Bowen et al. ............... 277/650 |
| 2004/0175571 A1 | 9/2004 | Buerger et al. |
| 2005/0202233 A1 | 9/2005 | Dove |
| 2005/0225037 A1 | 10/2005 | Dove |

FOREIGN PATENT DOCUMENTS

| | | |
|---|---|---|
| DE | 4322373 | 1/1994 |
| EP | 0167466 | 1/1986 |
| GB | 2229047 | 9/1990 |
| GB | 2268551 | 1/1994 |
| JP | 5572950 | 6/1980 |
| JP | 57192670 | 11/1982 |
| JP | 4331876 | 11/1992 |
| JP | 963625 | 3/1997 |
| JP | 2003106456 | 4/2003 |

* cited by examiner

SEAMLESS CORRUGATED INSERT GASKET AND METHOD OF FORMING THE SAME

The present invention relates generally to gaskets and particularly to hybrid gaskets constructed of polymers containing inserts for structural support and performance enhancements. More specifically, the present invention relates to a seamless gasket with an internal structural support and a method for making such a gasket.

BACKGROUND OF THE INVENTION

Gaskets having both polymer (PTFE) and metal components have been known and used for many years. These types of gaskets are acceptable for many gasket applications. Typically, a corrugated metal insert is combined with polymer layers, tapes, or the like to form a gasket able to seal with lower bolt loads, provide improved thermal cycling, and withstand increased pressure resistance.

Conventional prior art gaskets will often have polymer rings sandwiched around a corrugated metal insert. The rings are attached to the insert and/or to each other by some form of adhesive. This sandwich-type construction has historically meant that the gasket has seams at the inside diameter (ID) and/or outside diameter (OD) of the gasket. All of the layers of the gasket, including the metal and adhesive layers, are exposed at the inside diameter and outside diameter of the gasket. Problems with these types of gaskets include corrosion or degradation of the various components of the gasket that may occur as a result of the exposure of the metal and/or adhesive to the process temperature and media in the system in which the gasket is used. Many industries including semiconductor, food and beverage, pharmaceutical and specialty chemicals cannot tolerate the potential for process contamination that exists with the metal and/or the adhesive being in contact with their process media. In applications above the softening or melt point of an adhesive (~200° F.) a typical failure mode or limitation is that the adhesive is corroded away, and the gasket seal may fail or require re-torquing as a result of the reduced bulk of the gasket. These higher temperatures may also result in blow-out failures when the adhesive is melted or softened.

If an insert is exposed, or is eventually exposed, to the environment, media, or other conditions in the system that the gasket is placed, prior art gasket construction requires the use of metal inserts that are chemically compatible with the process being sealed. For many corrosive chemical applications where the tightness, pressure resistance and resiliency of this type of gasket is required, exotic alloy inserts such as hastalloy, titanium, and other similar products are required. The resulting gaskets are very expensive and the required adhesive layers will still suffer from the same thermal degradation or chemical corrosion as described above. Both of these limitations may limit or prevent the use of the gasket design and the resultant performance benefits. Also, while exotic alloy inserts may allow the use of these gaskets in harsh chemical applications, there is no means of making this design suitable for use in applications like semiconductors, food and beverage, or specialty chemicals where contamination from the adhesive is the limiting factor.

FIG. 1 illustrates one prior art gasket that was developed to minimize the limitations of the earlier style corrugated insert gasket stated above. In this construction methodology, the gasket includes a single polymer ring that has a slit in it that extends around the outside diameter from the outside diameter toward the inside diameter. The slit does not extend all the way through the polymer ring to the inside diameter. A metal insert is positioned in the pocket that is formed by the slit of the polymer ring. The metal insert may or may not have an outside diameter essentially the same as the polymer ring. This gasket design effectively isolates the corrugated insert at the ID from the process media thus eliminating one of the limitations with the original gasket design. Whether or not the metal insert is directly exposed to the outside diameter of the gasket, the general conditions in a plant or a system where the gasket is used may still attack or thermally degrade the adhesive and/or the metal insert via the slit in the outside diameter of the gasket. Additionally, application for this improved gasket in PTFE lined piping systems can be negated because of static electricity discharge between the exposed metallic OD of this gasket construction to the bolts that secure the flange together. Also, because glue or some form of adhesive is still required with this design, the gasket's use within piping systems or vessels where any type of contamination is undesired is still restricted. The manufacturing technology and throughput with this pocket style gasket stated above is very expensive, very labor intensive, and stringent quality control measures must be employed to insure that the slit never extends all the way to the ID. If this were to happen and go unchecked, this gasket could fail catastrophically in chemical services that are not compatible with the insert metallurgy.

Accordingly, despite the advancements made with the ID protection envelope detailed above, there remains a need for a completely seamless metallic or corrugated metallic insert gasket that does not contain any seams at the ID or OD and a cost effective method to create such a gasket which does not rely upon careful slitting of the envelope material that is placed around the insert. A seamless corrugated/metallic insert gasket would ideally prohibit or lessen the ability of a corrosive agent to attack or degrade any structure of the gasket. A seamless corrugated/metallic insert gasket and a method for making the same, in accordance with the present invention, would effectively address one or more of the foregoing or other drawbacks associated with prior art gaskets.

Another prior art PTFE gasket is the "Task-Line" type gasket where a perforated stainless steel (SS) insert is encapsulated within a full density (hard) PTFE matrix. This gasket is made using molds whereby PTFE resin is charged into the mold, the insert is then added, and more PTFE resin is added on top of that. The PTFE resin and insert are compressed under extreme pressure at elevated temperatures above the PTFE melt point temperature. The PTFE resin therefore forms a hard, solid mass encapsulating the insert. The finished gasket is very hard (the PTFE is at full density, about 2.2 gm/cc), there are virtually no recovery/resiliency advantages with this design, and creep of the virgin PTFE remains very problematic.

Accordingly, there is a need for a finished gasket with any desired PTFE "skin" density between an expanded PTFE density (typically about 0.6 gm/cc) and the theoretical "full density" of PTFE (about 2.2 gm/cc). In the prior art Task-Line gasket above, the PTFE resin is melted above the PTFE sintering temperature and flows/compacts together around the insert. There is needed the beneficial physical properties of the lower density expanded, porous or microcellular PTFE. An approximate 0.6 gm/cc density PTFE "skin" or facings around the insert are desirable for flange surface adaptability (conformability) and low stress to seal, while higher "skin" densities are desirable when the flange surfaces do not require a highly compressible facing material or cut-through resistance at higher stresses. The use of various expanded, porous, or microcellular PTFE components allows the final gasket to have much improved creep resistance over the Task-Line (virgin, hard) PTFE gasket. Also, improved gasket resiliency/springback is a major performance advantage of any corrugated insert PTFE gasket with soft PTFE facings. The hard PTFE skin of the Task-Line gasket negates any benefit of a corrugated insert, and thus there are no known commercial Task-Line products with a corrugated insert.

SUMMARY

In accordance with the present invention, there is provided a seamless corrugated/metallic insert gasket and a method of making the same. The gasket includes a structural insert fully surrounded by at least one polymer, such as polytetrafluoroethylene ('PTFE'). In one preferred embodiment, the insert is a corrugated metal ring.

Gaskets are often formed from non-reactive polymers. PTFE is a common gasket polymer that is a generally non-reactive, high purity, durable material. For instance, PTFE gasket materials can be compressed between two surfaces and provide, initially, an effective seal at ambient temperature and moderate bolt load. However, PTFE can be damaged in high bolt-load assemblies (i.e., the gasket is exposed to very high compression). Additionally, the creep or flow properties of PTFE are exacerbated at temperatures above ambient, and all PTFE based gaskets exhibit very low springback or recovery. Therefore, one proven PTFE gasket technology that offers improved pressure resistance, recovery and creep performance will typically include some internal structural support or insert. Expanded PTFE sheet materials are naturally very "floppy", and inserts are used with this material to also impart greater gasket rigidity. Gasket manufactures have attempted to introduce these inserts into the gaskets in a number of ways.

PTFE can have an elongated form, like a tape, that is successively wrapped around an insert in an offset pattern until the entire insert is covered by the PTFE tape. In another very common construction, the PTFE includes two layers of PTFE bonded together by an adhesive wherein the insert is placed between the layers. This sandwich construction is prone to the adhesive being degraded at both inner diameter ("ID") and outer diameter ("OD") seams. Polymer rings can also be slit along their outside diameter to allow a support to be inserted between the upper and lower surfaces of the ring (See FIG. 1). Overall, in these and other prior art approaches, seams are created that allow process fluid to seep between and attack the metallic inserts and the gaskets cannot be manufactured with high consistency or in a high volume, automated fashion. In the present invention, an expanded, porous, or micro-cellular polymer fully encases an insert in a seamless fashion. In practice, the seamless hybrid gasket comprises first and second annular rings comprising a polymer. In one preferred embodiment, the polymer is PTFE or expanded PTFE. The polymer, in other preferred embodiments, is envisioned as porous PTFE, filled PTFE, or microcellular PTFE. Other polymer choices are available. It is foreseen that the two polymer layers may not be the same exact polymer.

The rings, or some other geometric shape, have inner and outer peripheries or diameters. In the case of rings, there are an ID and an OD, wherein the width of the first and second rings is the radial distance from the inside diameter to the outside diameter. The gasket also includes an insert, which in one preferred embodiment is a corrugated metal ring, having an ID greater than the ID of the first and second rings and an OD less than the OD of the first and second rings. The insert can be any metal, but is preferably selected from the group consisting of stainless steel, carbon steel, copper alloy, nickel alloy, titanium alloy and hastalloy. The insert is sandwiched between the first and second rings without using any adhesive. The first and second rings are then unified around the insert so that the gasket has a seamless ID and OD.

The two or more PTFE layers are unified under the application of heat and pressure. The process of unifying the layers, as opposed to the old techniques, creates a seamless gasket that includes the structural benefits of having an internal rigid support, without any of the drawbacks of the prior art technologies (adhesive volume loss, adhesive contamination, OD metal exposure, ID metal exposure, slit location and depth, etc. Additionally, this process is much more capable of high volume, automated manufacturing than any of the current technologies. The ability to provide a seamless inside diameter and outside diameter of a hybrid gasket comprised of a unitary polymer construction around an insert is a new gasket construction, and a new method of gasket construction.

The method of unifying the polymer layers is another aspect of the present invention. In use, the method includes providing at least two sheets, each comprising a polymer material. An insert, generally an annular ring, comprised of a corrugated metal is placed between the two sheets. The plurality of sheets are unified around the annular ring, and the resulting sheet is cut into the desired gasket shape. The inside diameter of the sheet is less than the inside diameter of the annular ring, and the outside diameter of the sheet is greater than the outside diameter of the annular ring. The method of forming a seamless hybrid gasket by unifying the sheets comprises heating the polymer sheets, applying pressure, and/or applying heat and pressure simultaneously through the use of, for instance, a heated platen press with a PLC (Programmable Logic Controller) to control the platen temperature and rate of heat up and cool-down, and an air-actuated cylinder to apply and maintain the required compressive load during the heating process. The result is a unitary polymer construction of low density expanded, porous or microcellular PTFE with a corrugated metal insert embedded therein. No adhesive is necessary, or alternatively, no adhesive is applied such that the resulting gasket has no adhesive exposed to the inside and outside diameters of the gasket.

The seamless hybrid gasket of the present invention effectively addresses one or more of the problems associated with prior art gaskets. For instance, the gasket of the present invention precludes the possibility of a corrosive agent corroding the glue layers between the different layers of PTFE that are typically found sandwiched about an internal gasket insert. The foregoing and additional features and advantages of the present invention will become apparent to those of skill in the art from the following detailed description of a preferred embodiment taken in conjunction with the accompanying drawings.

DETAILED DESCRIPTION

FIGS. 2 through 4B illustrate one or more preferred embodiments of the present invention. Naturally, a person having ordinary skill with the assembly and construction of gaskets will be able to create a gasket that incorporates the teachings of the present invention, but which may look different and incorporate different, alternative parts.

Figure 1:
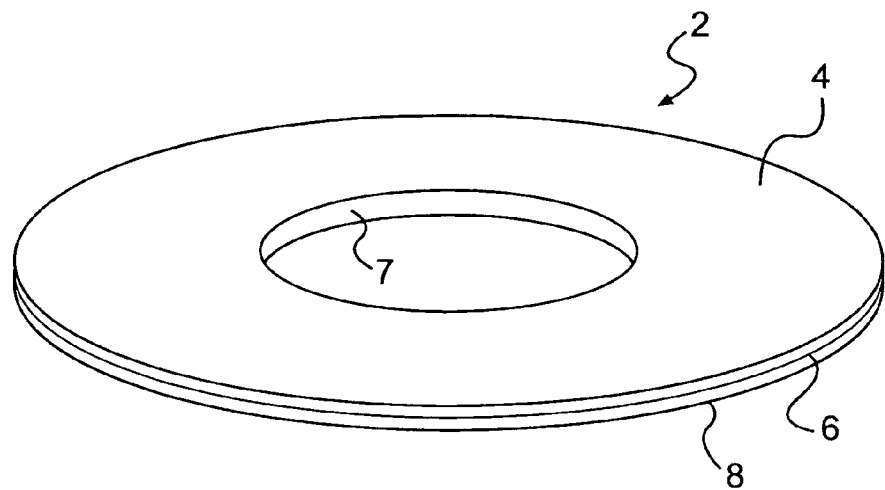
FIG. 1 is a perspective view of a prior art gasket with an outer diameter ('OD') seam.

Turning first to FIG. 1, there is illustrated a prior art embodiment of a conventional gasket 2 comprised of a polymer ring 4 and an insert (not visible). An individual, solid polymer ring must first be formed into an envelope so it is partially separated about a slit 6 that extends around the entirety of the outer diameter 8. The slit 6 creates an upper portion and a lower portion, but the slit does not extend fully to the inner diameter. Therefore, there is effectively a pocket created in ring 4 along the outer diameter 8 of gasket 2. This slit 6 must be carefully formed such that the two portions of the envelope are approximately the same thickness (the slit should occur halfway through the original polymer ring thickness), and the depth of the slit must be carefully controlled such that it does not extend too close to or through the ID 7 of the polymer ring.

The insert is positioned within the pocket. (During this positioning step, the slip envelope is also prone to tearing.) The insert will generally have an OD equal to or less than the OD of ring 4. Here, it should be apparent that the insert's OD is less than the OD of the ring because the insert is not visible. An adhesive is applied to the overlapping portions of the ring, the insert, or both. This pocket-type construction means that all of the layers of the gasket, including the insert and adhesive layers, are exposed at the OD seam. This creates durability, contamination and safety issues, as discussed above. Basically, corrosion or degradation of the various components of the gasket may occur as a result of the exposure of the insert and/or adhesive to the environment and media around a given system in which the gasket 2 is used. For instance, most currently used adhesives soften, flow and ultimately decompose when exposed to temperatures above 200 F, and because of the loss of bulk within the gasket, the bolts loosen and require re-tightening (exactly the failure mode that the gasket design attempts to overcome). The flow, degradation and ultimate disappearance of the adhesive layers pose a contamination issue (pharmaceutical, specialty chemical, food and beverage, and semi-conductor facilities will not use this type gasket because of process contamination) and a corrosion issue (many of the adhesives used contain chlorides which will attack stainless steel under certain conditions, and several companies again will not use this gasket technology because of corrosion concerns with their piping and equipment).

Figure 2:
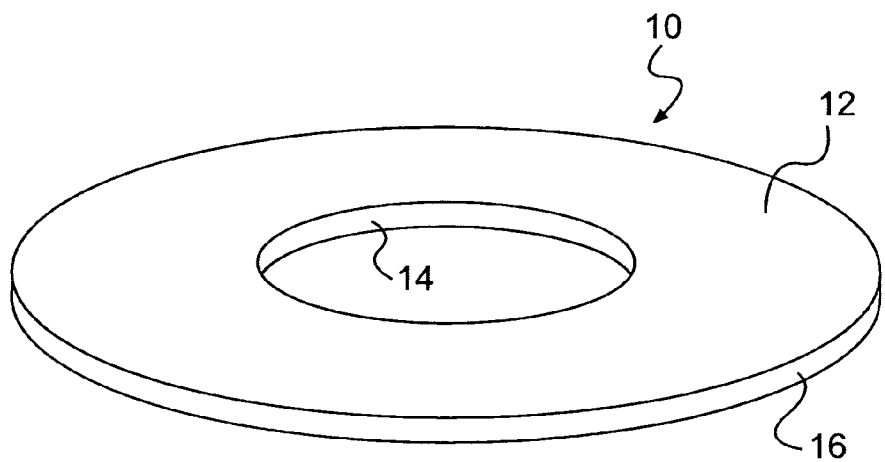
FIG. 2 is a perspective view of a seamless hybrid gasket in accordance with the present invention.

Referring now to FIG. 2, a seamless hybrid gasket 10 in accordance with the present invention is illustrated. Gasket 10 comprises a unitary polymer construction 12. In one preferred embodiment, the polymer is PTFE or expanded PTFE. The polymer, in other preferred embodiments, is envisioned as porous PTFE, filled PTFE, microcellular PTFE, and the like. Other types of polymers may be selected, including other expandable or filled polymers that may compress. It is also foreseen that the polymer construction may be a mixture or combination of two or more polymers. Here, gasket 10 is illustrated as a conventional circular shape with an ID 14 and an OD 16. Other shapes are available.

Figure 3:
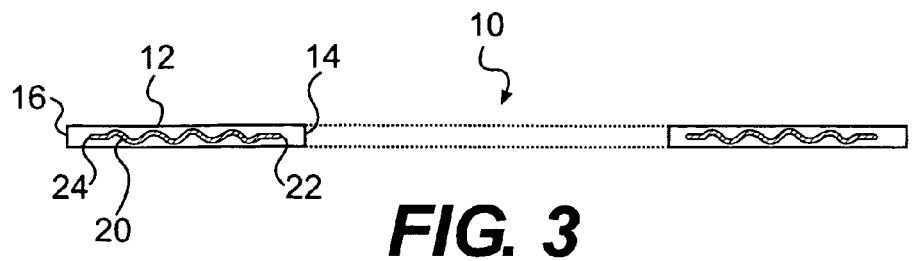
FIG. 3 is a side, cut-away view illustrating the construction of the gasket in accordance with the present invention.
Figure 4A:
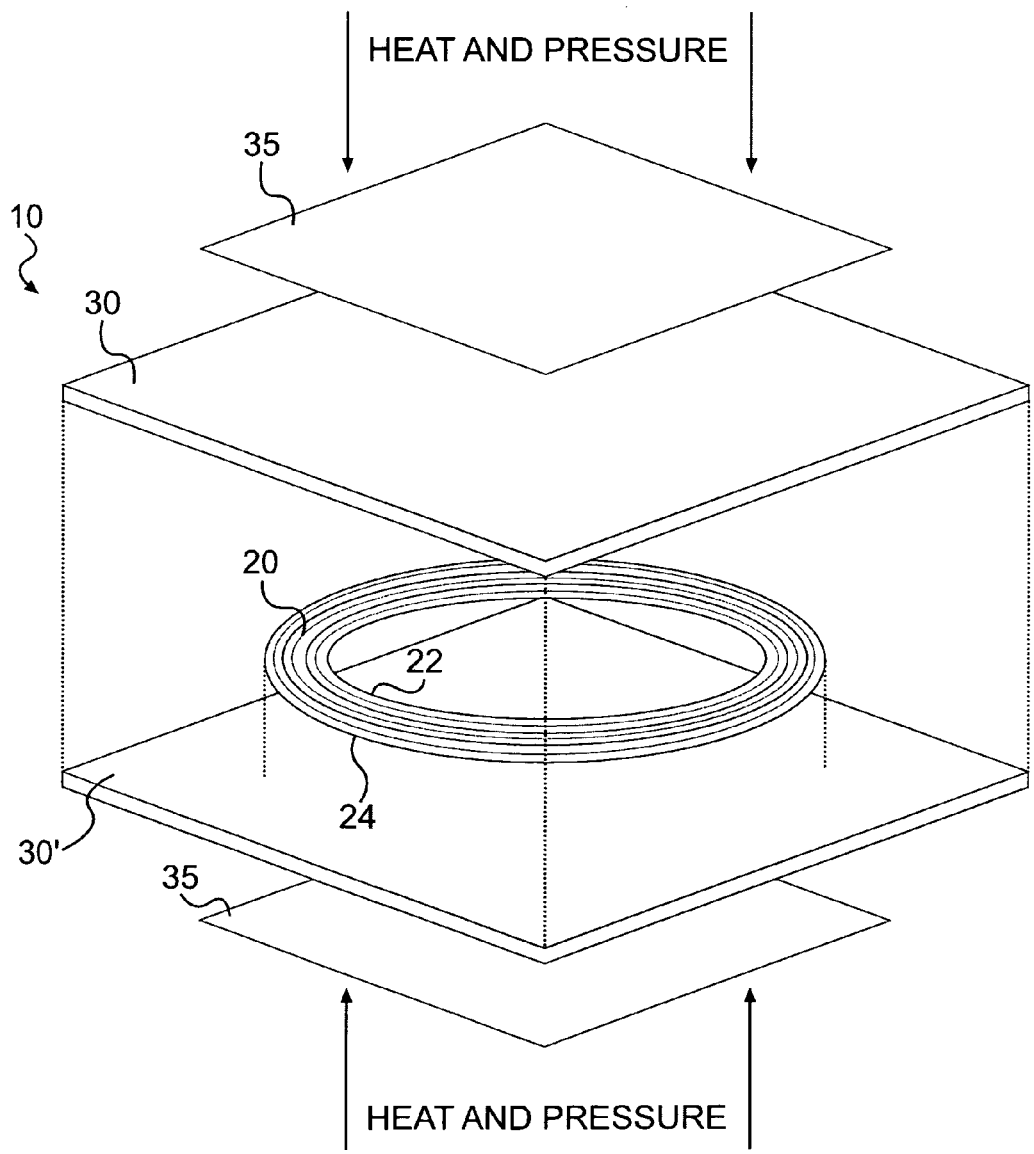
FIG. 4A is a perspective view of the components of the present invention in a spaced relationship in order to illustrate the method of forming a hybrid gasket in accordance with the present invention.

As best seen in FIGS. 3 and 4A, the gasket 10 also includes an insert 20, which, in one preferred embodiment, is a corrugated metal ring having an insert ID 22 greater than the ID 14 of polymer 12 and an insert OD 24 less than the OD 16 of polymer 12. Insert 20 can be any metal, but is preferably selected from the group consisting of stainless steel, carbon steel, copper alloy, nickel alloy, titanium alloy and hastalloy. Insert 20 is fully embedded in the polymer 12. FIG. 3 provides a cross-section view of gasket 10 illustrating the corrugated structure of insert 20.

The polymer 12 can be formed of expanded PTFE having a predetermined density. One conventional way to form sheets of expanded PTFE is to wrap thin PTFE membranes on a mandrel to a predetermined thickness. The PTFE membranes are then heated to unify the membrane layers into a unitary PTFE construction. Typically, commercial expanded PTFE sheets can have a density ranging from about 0.5 gm/cc to about 1.1 gm/cc. Through careful process controls of heat, pressure and time of heat and pressure, the present gasket can be engineered to have any specific or predetermined density within the range of about 0.2 to 2.2 gm/cc, preferably about 0.5 to 2.0 gm/cc.

In more detail, and as illustrated in FIG. 4A, seamless hybrid gasket 10 is formed from at least two initial sheets of polymer 30, 30' that are then unified to form a unitary polymer construction 12, completely encapsulating the insert 20. The polymer sheets can be any shape that covers insert 20 in a manner to allow contact between the sheets 30, 30' along portions of the polymer inside the entirety of insert ID 22 and outside the insert OD 24. Heat and pressure can then be applied to one or both sheets 30, 30' to unify them.

In one example, sheets 30, 30' are pressed together at about 650 F degrees and two-three pounds per square inch ('psi') of contact stress. Sections of expanded PTFE sheet are placed around a stainless steel insert that is smaller than the squares. The components are transferred to heat press platens 35. The air pressure in the compression cylinder applying load to the platens is adjusted to the pressure necessary to develop two-three psi stress across the square sections of expanded PTFE, and the top and bottom platens are brought together around the components. A programmable logic controller is configured to ramp up the heat of the platens to 650 F at a rate of approximately 10 degrees per minute. Once at temperature (650 F), the components are held at this temperature, under the two-three psi stress, for a minimum of 5 minutes. After 5 minutes, the platen heaters turn off and the entire fixture is cooled to about 210 F. degrees, while under load. At 210 F or lower the platens are released and the unified PTFE/metal components are released from the platens.

The density of the polymer is one factor in determining the correct processing conditions. The density of the PTFE in the completed gasket may be determined prior to manufacturing. The starting density of the PTFE material, the platen temperature and the compressive stress applied to the components during the heating and cooling process, all will impact the resultant density of the PTFE of the finished gasket. In the foregoing example, the polymer sheets were heated to 650 F. degrees. The heating range will vary depending on specific polymer used. When heating PTFE, an exemplary heating range includes from about 600 to 675 F. degrees.

Figure 4B:
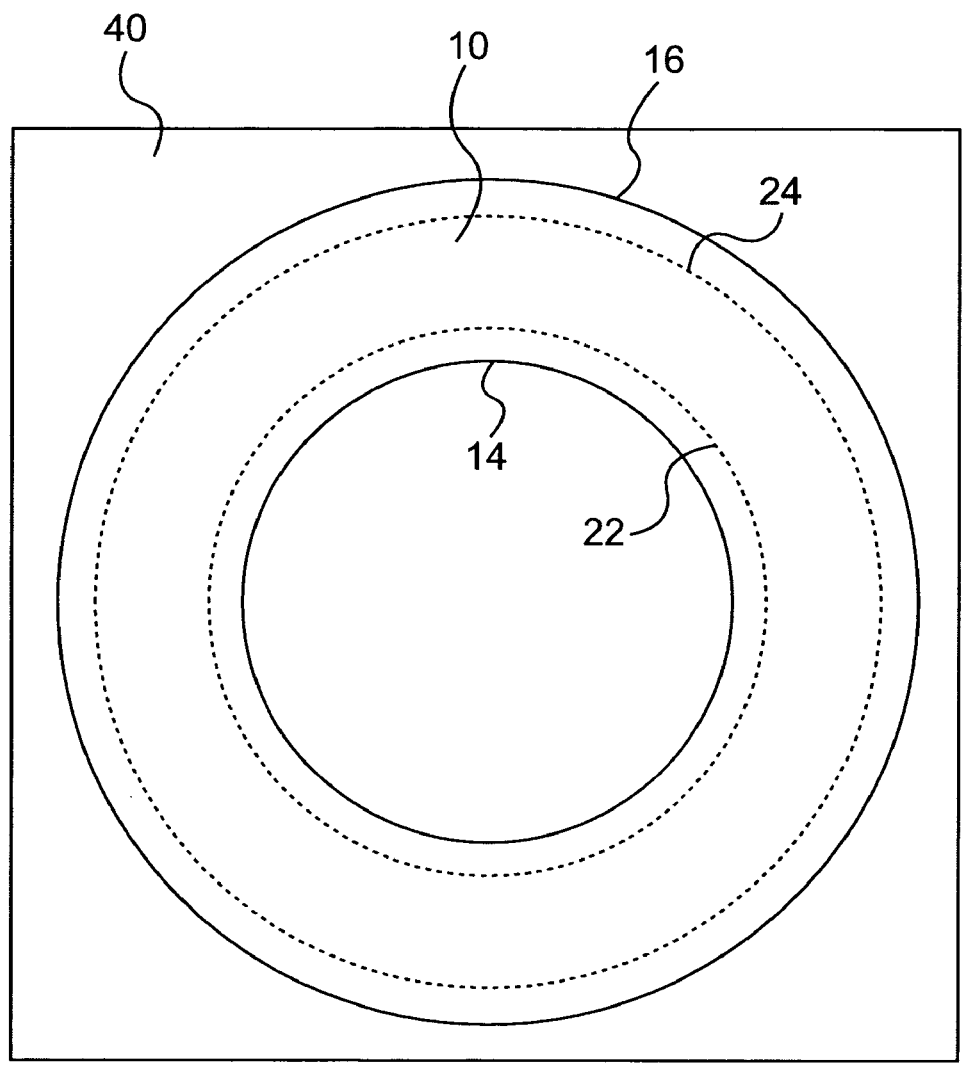
FIG. 4B is a top-down view of the gasket of the present invention.

The result of the fusing process, as seen in FIG. 4B, is a sheet 40 to be sectioned into gasket 10. In this illustrated embodiment, a circular insert and a circular-shaped gasket are desired. Therefore, sheet 40 is cut, punched, or the like to create the gasket OD 16 and inner ID 14. From this view, the insert ID 22 and insert OD 24 are also shown in broken lines.

The method produces seamless hybrid gasket 10. Insert 20 is fully insulated from the environment and media that will contact gasket 10. The absence of any seams precludes the possibility of a seam adhesive degrading over time. The result is an improved gasket applicable for a wide range of applications.

Figure 5:
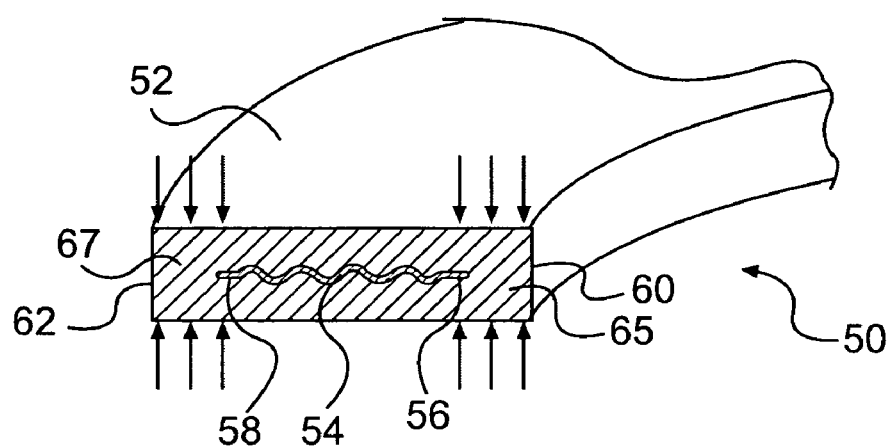
FIG. 5 is a side, perspective, crossectional view of an alternative method of forming a hybrid gasket in accordance with the present invention.

Turning now to FIG. 5, there is shown an alternative embodiment of a gasket 50 made up of a polymer ring 52 formed around a metal insert 54. The polymer ring 52 component of the gasket 50 defines an inside diameter 60 and outside diameter 62. The metal insert 54 defines an insert inside diameter 56 and an insert outside diameter 58. In this alternative embodiment, the polymer 52 is compressed along the inside portion 65 and outside portion 67 of the polymer ring 52, or alternatively at greater heat and/or pressure at the inside and outside portions. In other words, in the example shown in FIGS. 4A and 4B, the entire gasket was subject to heat and pressure to unify the two or more polymer sheets around a metal insert. In the example of FIG. 5, heat and pressure, shown in arrows, are applied only around the inside portion 65 and outside portion 67 of the polymer ring 52. In this way, the portion of the ring 52 that is generally adjacent to the metal insert 54 is not heated or compressed. The characteristics of the polymer that make up the polymer ring 52 would be relatively unchanged in the area of the gasket 50 that is adjacent and above and below the metal insert 54. The polymer rings that form the polymer section 52 are only unified inside of the inside diameter of the metal insert and/or outside the outside diameter of the metal insert. In this alternative embodiment, the inside portion 65 and outside portion 67 of the gasket 50 can be subjected to extreme heat and pressure to very securely lock or embed the metal insert 54 within the polymer ring 52. In this example also, the polymer sheets that make up the polymer ring 52 may be in the shape of separate rings. In other words, the formative polymer sheets may have the same inside diameter and outside diameter as those of the formed gasket, so no subsequent trimming step would be necessary.

In a variation of this example in FIG. 5, the inside and outside portions 65 and 67 may be subject to sufficient heat and pressure so that the unified portions are relatively rigid to improve installability of the gasket. In practice, the inside and outside portions 65 and 67 would have a pinched appearance that is a result of densifying the select portions of the gasket relative to the rest of the gasket.

Figure 6:
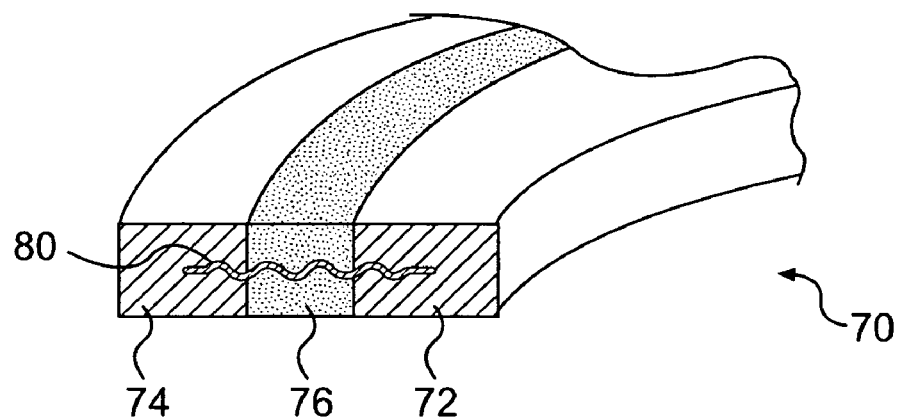
FIG. 6 is a side, perspective, crossectional view of an alternative construction of a gasket of the present invention.

FIG. 6 is a still further alternative embodiment of the gasket 70. In this alternative, the gasket 70 is comprised of an inner, annular polymer component 72 outer, annular polymer component 74 and parallel but sandwiched components 76. In one example, the portion 76 is comprised of flexible graphite material. The polymer components 72 and 74 are unified around the metal insert 80.

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. A seamless corrugated insert gasket comprising:
    first and second annular rings comprising a polymer selected from the group consisting of PTFE, porous PTFE, expanded PTFE, filled PTFE and microcellular PTFE, the first and second rings having an inside diameter and an outside diameter, wherein the width of the first and second rings is the radial distance from the inside diameter to the outside diameter;
    an insert comprising a third annular ring of corrugated metal, the insert having an inside diameter greater than the inside diameter of the first and second rings and an outside diameter less than the outside diameter of the first and second rings;
    wherein the insert is sandwiched between the first and second rings, and further wherein the first and second rings are unified around the insert to form a unitary polymer construction that fully encases the insert in a seamless fashion and wherein the density of the unitary polymer construction of the finished gasket is between about 0.5 and 2.0 gm/cc;
    whereby the gasket is seamless including a seamless inside diameter and a seamless outside diameter.

2. The seamless corrugated insert gasket as described in claim 1, wherein the polymer is expanded PTFE.

3. The seamless corrugated insert gasket as described in claim 1, wherein the insert is comprised of a metal selected from the group consisting of stainless steel, carbon steel, copper alloy, nickel alloy, titanium alloy and hastalloy.

4. The seamless corrugated insert gasket as described in claim 1, wherein the first and second rings are comprised of the same polymer.

5. The seamless corrugated insert gasket as described in claim 1, wherein the first and second rings are comprised of two different types of polymer.

6. A seamless gasket comprising:
    a unitary polymer construction and a corrugated metal insert embedded therein wherein the polymer fully encases the insert in a seamless fashion;
    wherein the density of the polymer is less than substantially the full density of the polymer; and
    further wherein the gasket defines an inside diameter and outside diameter, and the gasket comprises no adhesive exposed at the inside and outside diameters.

7. A seamless gasket as described in claim 6, wherein the polymer is selected from the group consisting of PTFE, porous PTFE, expanded PTFE, filled PTFE and microcellular PTFE.

8. A seamless gasket as described in claim 7, wherein the density of the polymer is between about 0.50 and 2.0 gm/cc.

* * * * *